United States Patent [19]

Peck

[11] 4,135,502

[45] Jan. 23, 1979

[54] STEREOSCOPIC PATTERNS AND METHOD OF MAKING SAME

[76] Inventor: Donald Peck, 23219 Lake Rd., Bay Village, Ohio 44140

[21] Appl. No.: 720,572

[22] Filed: Sep. 7, 1976

[51] Int. Cl.² .............. A61H 5/00

[52] U.S. Cl. .............. 128/76.5; 350/130; 351/33

[58] Field of Search .............. 128/76.5; 40/137, 132 B, 40/36, 106.53, 106.51; 351/1-3, 13, 33; 350/130, 144; 354/113; 235/487, 490

[56] References Cited

U.S. PATENT DOCUMENTS

| | | | |
|---|---|---|---|
| 759,229 | 5/1904 | Bechtold et al. | 40/132 B |
| 1,955,275 | 4/1934 | Draper | 354/113 |
| 2,035,511 | 3/1936 | Silverstein | 128/76.5 |
| 2,114,060 | 4/1938 | Oakley | 351/3 X |
| 2,391,248 | 12/1945 | Koch | 351/3 |
| 2,603,124 | 7/1952 | Richards | 351/33 |
| 3,143,642 | 8/1964 | Compare | 235/487 |
| 3,226,867 | 1/1966 | Newton | 350/144 X |

FOREIGN PATENT DOCUMENTS 17229 of 1899 United Kingdom .............. 128/76.5

OTHER PUBLICATIONS

Bauch and Lomb Stereoscopic Test Chart 1926.

*Primary Examiner*—Robert W. Michell
*Assistant Examiner*—Michael H. Thaler
*Attorney, Agent, or Firm*—Bosworth, Sessions & McCoy

[57] ABSTRACT

Stereoscopic patterns are disclosed which have a multiplicity of representations on a backing, with the representations spaced apart in substantially horizontal rows. The spacing between pairs of adjacent representations is varied to produce a stereoscopic effect. The resulting pattern is continuous, eliminating the ghost images associated with prior art stereoscopic pictures. The representations may be identical, may be varied shapes formed of identical elements, or may be a sequential series of perspective views of the same subject. The patterns may be viewed stereoscopically in either of two manners: by diverging or straightening one's line of vision while holding the pattern relatively close, or by converging or crossing one's line of vision while holding the pattern relatively far away. When viewed in the first manner, the patterns simulate distance vision while being held close-up, providing relaxing viewing to the eyes of one engaged in close work.

19 Claims, 16 Drawing Figures

40 45 47 48 42 41 51 52 44 46 43

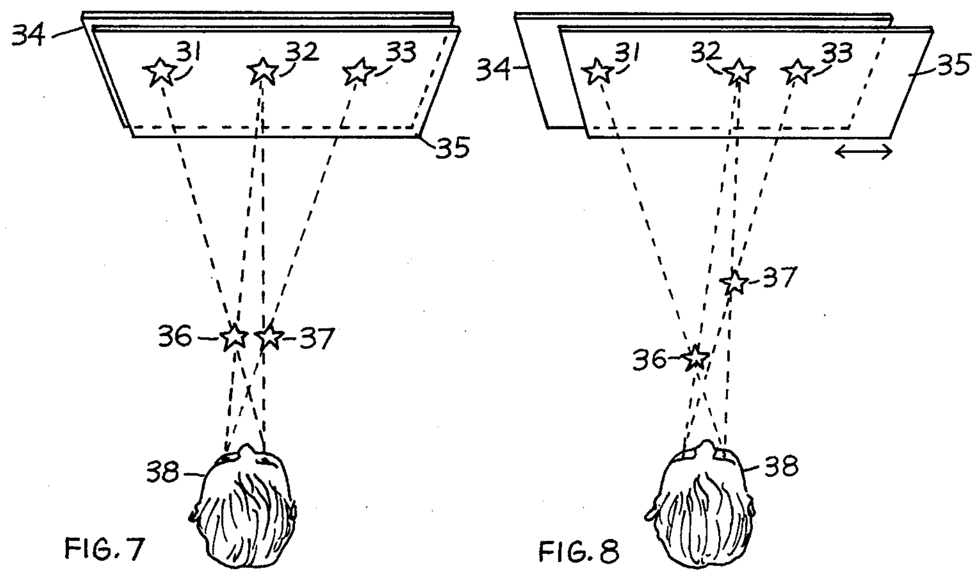
34
31
32
33
35
36
37
38
FIG. 7
34
31
32
33
35
37
36
38
FIG. 8
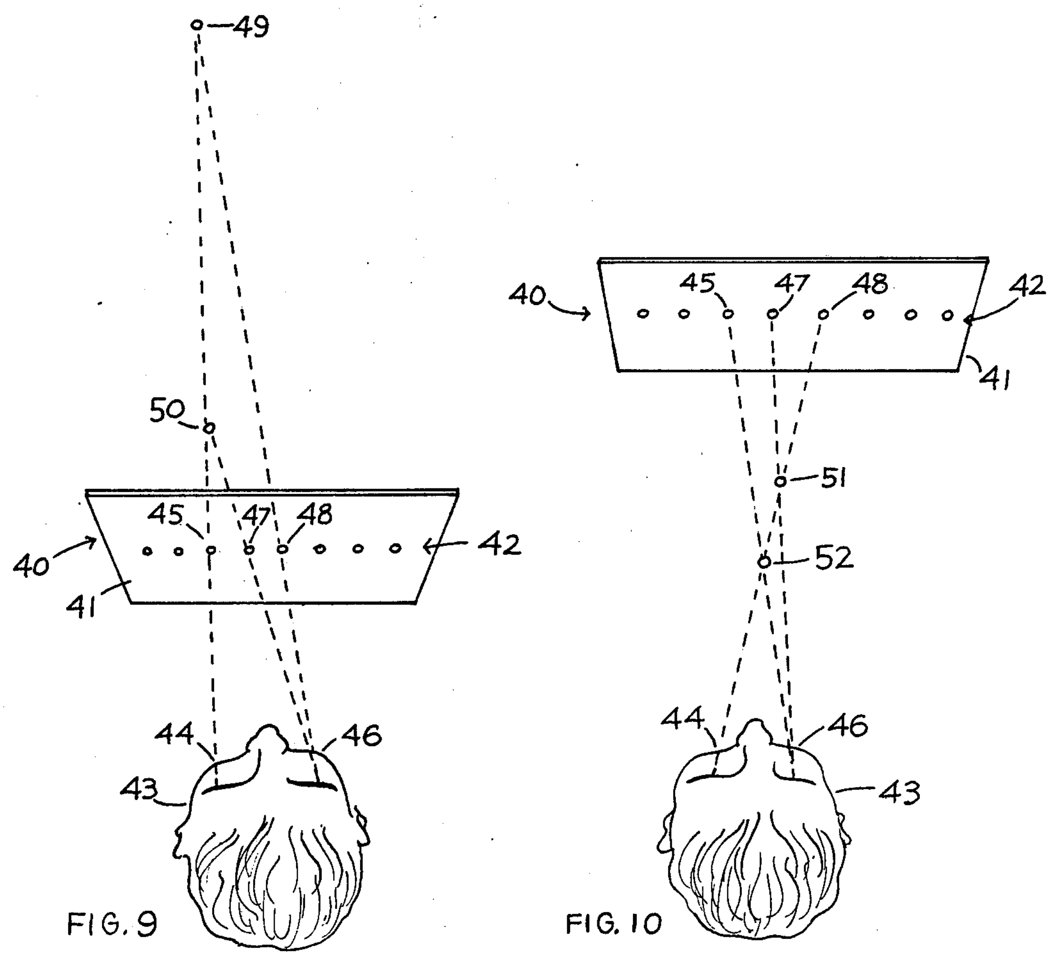
49
50
45
47
48
40
42
41
44
46
43
FIG. 9
40
45
47
48
42
41
51
52
44
46
43
FIG. 10

STEREOSCOPIC PATTERNS AND METHOD OF MAKING SAME

FIELD OF THE INVENTION

This invention relates to the field of optics and specifically to a method of making patterns which provide a stereoscopic effect when viewed and to the patterns made by such method.

BACKGROUND OF THE INVENTION

It has been known in the art that pictures can be produced with a stereoscopic or three-dimensional effect by providing two separate two-dimensional pictures, one of which is viewed by the left eye and the other viewed by the right eye. These stereoscopic pictures are commonly viewed by looking through a viewer or by projection onto a screen to be viewed with special polarized glasses. Examples of such stereoscopic pictures can be found in U.S. Pat. Nos. 2,144,253, 2,560,658 and 2,798,326.

The picture shown in U.S. Pat. No. 2,144,253 is typical of prior art stereoscopic pictures. While this picture is specifically designed to be looked at through a viewer, one can with practice view the picture directly by holding the picture relatively close to one's eyes while aiming one's vision at a distance so that the left eye sees the left picture and the right eye sees the right picture, the two pictures thus merging to form a stereoscopic image. This form of stereoscopic picture, however, has several disadvantages. Viewing the picture not only produces a stereoscopic image, but also produces two ghost images one on each side of the stereoscopic image. In addition, the viewer must focus his eyesight precisely on the two pictures, and if his eyes stray, he will lose the stereoscopic effect.

SUMMARY OF THE INVENTION

It is an object of the present invention to provide a stereoscopic pattern which is continuous and thereby eliminates the ghost images associated with the prior art stereoscopic pictures. Another object is to produce a stereoscopic pattern which can be viewed in any of three ways: by holding the pattern at a distance and crossing the eyes and converging the line of sight, by holding the pattern relatively close to the eyes and viewing with a straight or diverging line of sight, or by viewing ordinarily without stereoscopic effect. Yet another object is to provide a stereoscopic pattern which can be viewed close-up while simulating distant viewing, thereby relaxing the eyes of one who is engaged in work requiring continuous close vision.

These and other objects are accomplished by the present invention of stereoscopic patterns and the method of making same. The patterns employ a multiplicity of representations spaced substantially horizontally with different spacing between pairs of adjacent representations to produce a stereoscopic effect. In effect, the pattern places adjacent pairs of stereo pictures with the left representation of one pair forming the right of the next, thus interlocking into a pattern or series which eliminates the ghost images associated with the prior art stereoscopic pictures. In addition to varying the spaces between the pairs of adjacent representations, each representation may be a one of a sequential series of perspective views of the same subject, thereby producing a stereoscopic effect within the images themselves.

BRIEF DESCRIPTION OF THE DRAWINGS

FIGS. 7 and 8 are schematic views illustrating the use of a sliding transparent overlay to produce a moving depth effect.

FIGS. 9 and 10 are schematic views illustrating another manner of viewing the patterns with a double overlap of representations.

DETAILED DESCRIPTION OF THE PREFERRED EMBODIMENTS

Figure 2:
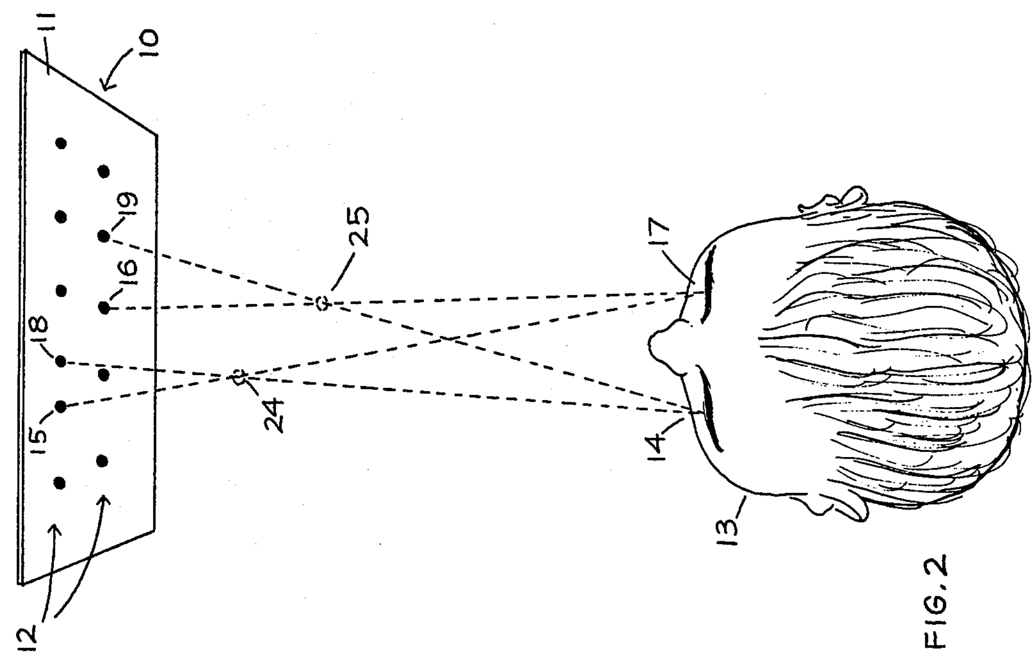
FIG. 2 is a schematic view similar to FIG. 1 showing the stereoscopic effect of the patterns when viewed "cross-eyed" with a converging line of sight.
Figure 1:
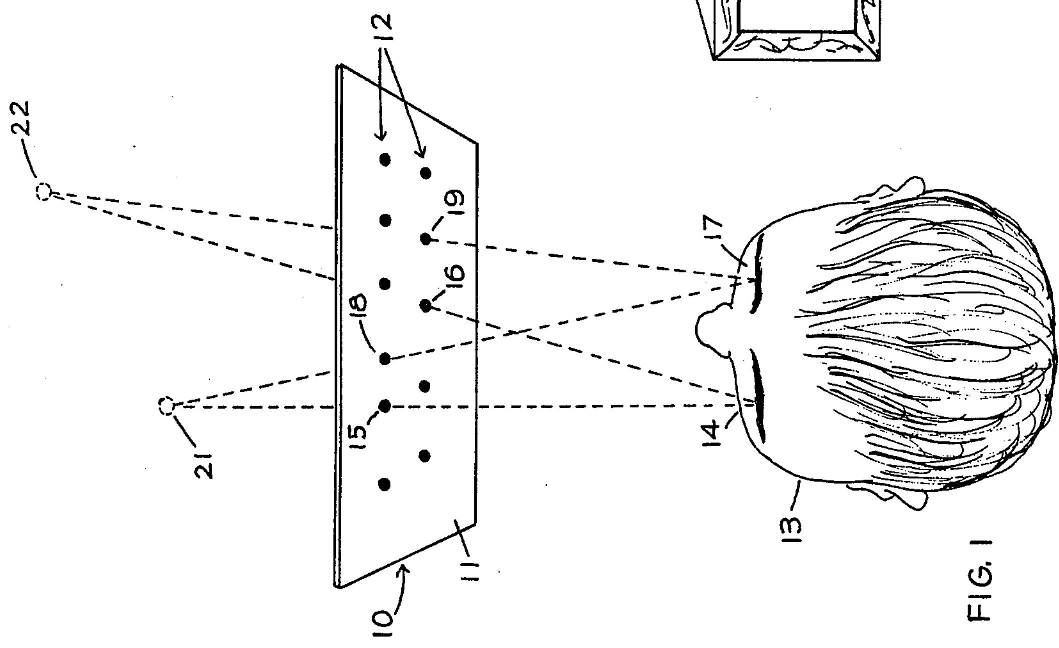
FIG. 1 is a schematic view showing the stereoscopic effect of the patterns when viewed with a diverging or straight line of sight.

Referring more particularly to the drawings and initially to FIGS. 1 and 2, there are shown schematic views of a pattern 10 produced in accordance with the present invention and two manners of viewing the pattern to produce a stereoscopic effect. The pattern 10 shown for the purposes of illustration in FIGS. 1 and 2 comprises a backing 11 with rows of horizontally spaced representations, such as dots 12. The spacing between each pair of adjacent dots 12 is varied from the corresponding spacing between the other pairs of adjacent dots. The pattern 10 shown schematically in FIGS. 1 and 2 is produced in FIG. 4.

As shown in FIG. 1 the pattern 10 is held relatively close to a viewer 13 (e.g. between 14 and 48 inches) and the viewer looks at the pattern while straightening or diverging his line of vision or aiming his vision at some distances beyond the pattern, so that his left eye 14 views the left dots 15 and 16 of each pair of adjacent dots and his right eye 17 views the corresponding right dots 18 and 19 of each pair of adjacent dots. When viewing in this manner, the pairs of dots merge and appear to be behind the backing 11 as indicated by images 21 and 22. Because the spacing between the pair of dots 15 and 18 is closer together, the image 21 produced by these dots appears to be closer to the viewer than the image 22 from the pair of dots 16 and 19 which are spaced further apart. In this manner a relative stereoscopic effect is produced.

In FIG. 2 the same pattern 10 shown in FIG. 1 can be viewed in a different manner to produce a different stereoscopic effect. In this case the pattern 10 is held relatively far away from the viewer 13 (e.g., at least approximately 20 inches) and the viewer crosses his eyes or converges his line of vision or aims his eyesight relatively close-up to view the pattern so that his left eye 14 views the right dots 18 and 19 of each adjacent pair of dots and his right eye 17 views the left dots 15 and 16. Viewing in this manner, the images appear to jump from the backing 11 and each of the images appears to the viewer to be spaced at some distance between him and the backing 11 as shown by images 24 and 25. The image 24 from the pair of dots 15 and 18 appears to be further away because these dots are spaced closer together while the image 25 from the pair of dots 16 and 19 appears to be closer to the viewer because those dots are spaced further apart.

Figure 3:
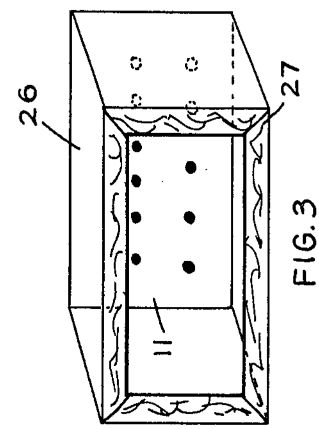
FIG. 3 is a perspective view of a pattern with a reference frame used as an aid when viewing the pattern in the manner shown in FIG. 2.

It is sometimes difficult for a viewer to aim his eyesight so that his line of vision converges relatively close to his eyes while, at the same time, viewing the pattern which is held relatively far away, as in FIG. 2, so it is sometimes helpful to provide a reference between the viewer's eyes and the pattern. This may be accomplished by stationing any object, such as a pencil or finger, at which the viewer may direct his eyesight between the pattern and the viewer's eyes approximately in the plane in which the images will be formed. Such an image plane reference may also be provided as shown in FIG. 3 by mounting the pattern 11 at the rear of an open box-like structure 26 which provides a frame 27 around the front of the box 26. The frame 27 provides a reference in the image plane for aiming the viewer's line of vision which helps the viewer to see the stereoscopic images produced by the representations in the pattern beyond the frame.

Figure 4:
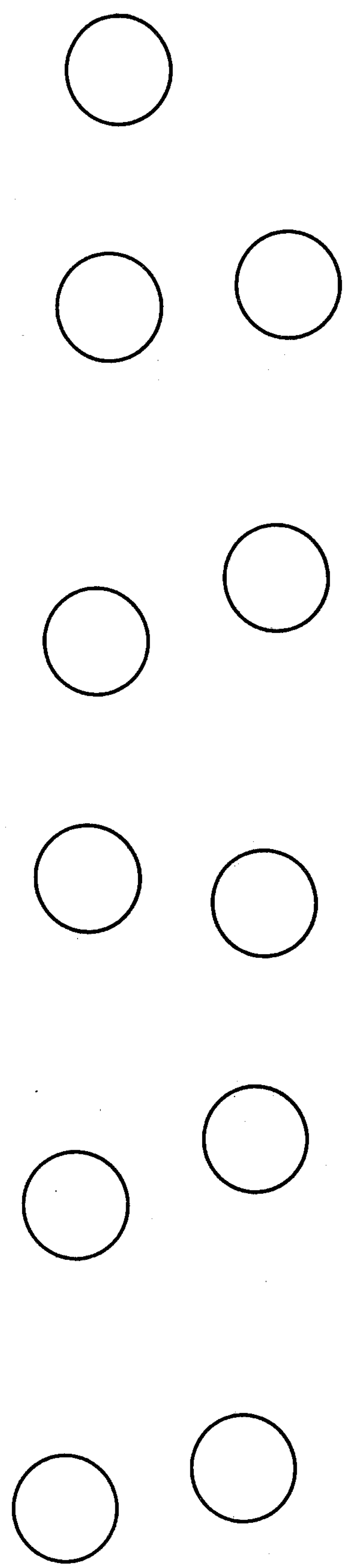
FIG. 4 is a simple stereoscopic pattern produced in accordance with the present invention similar to that shown schematically in FIGS. 1 and 2.
Figure 5:
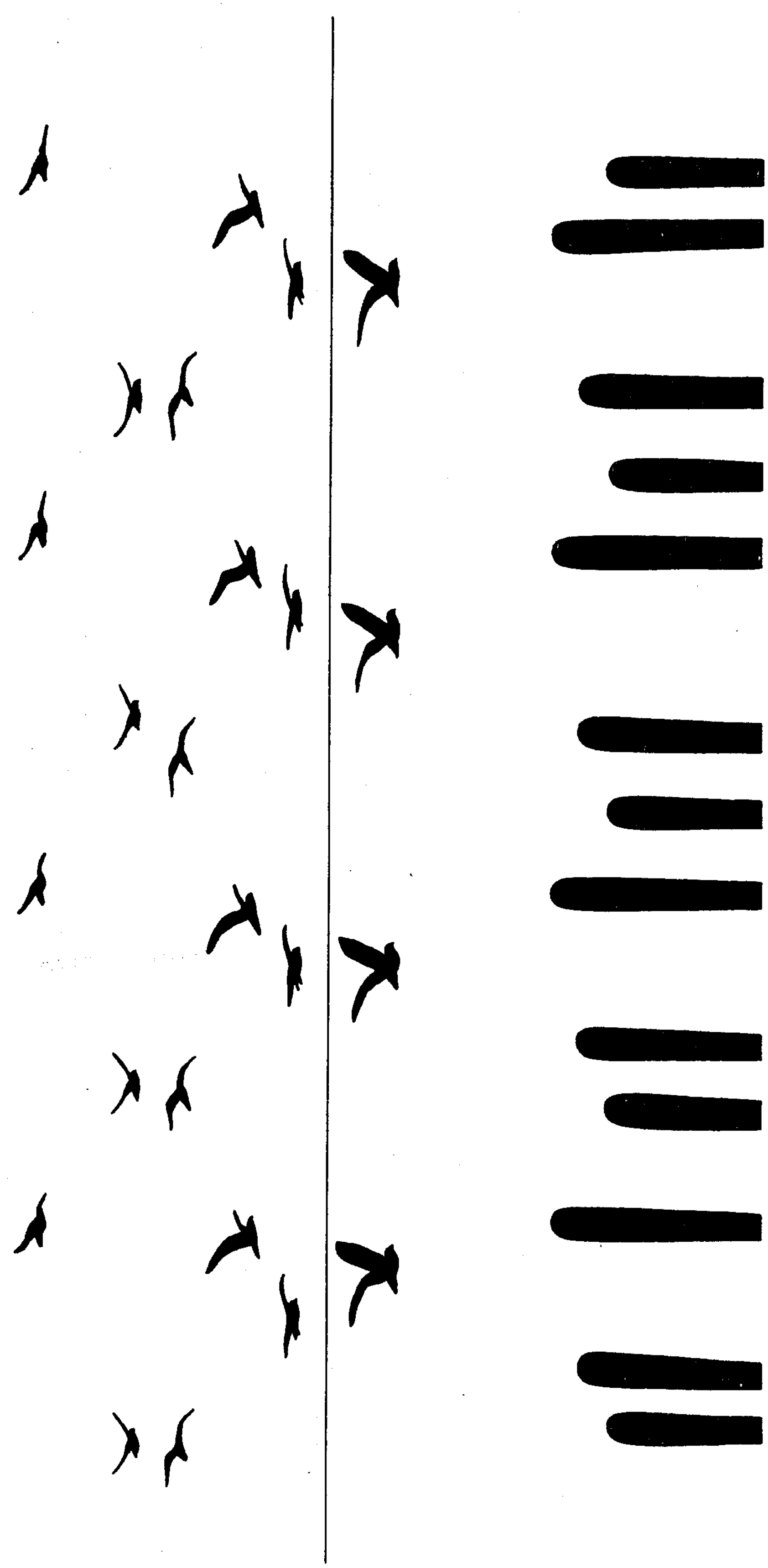
FIG. 5 is another more complex stereoscopic pattern produced in accordance with the present invention.

In FIG. 4 dots have been chosen for each of the representations for the purposes of simplicity; however, the representations could be stars other symbols, or more complex objects, as shown in FIG. 5. The pattern of FIG. 5 can be viewed in either of the two manners previously discussed. In addition, it can be seen that a pattern such as that of FIG. 5 can be attractive and decorative when ordinarily viewed without stereoscopic effect.

When using simple representations such as those in FIGS. 4 and 5, it is important in the production of a stereoscopic image that each representation in the same horizontal row be exactly identical. If the representations are not exactly identical, they will not merge properly to form an image, making it difficult to achieve a stereoscopic effect. (When using more complex representations as hereinafter described, it will be understood that the representations need not be exactly identical, but may be varied slightly in a prescribed manner.)

In addition to the dots, stars, symbols and objects already shown, it is also possible for the representations to be generally vertical lines, with the lines functioning as a mass of small connected dots. By arranging the lines at angles which vary slightly with the vertical, the images produced by the lines will appear to have depth and to slant toward and away from the viewer. Since the lines are arranged at slightly varying angles, the distance between the line representations varies, thus producing a stereoscopic effect which varies the depth of the images.

Figure 6:
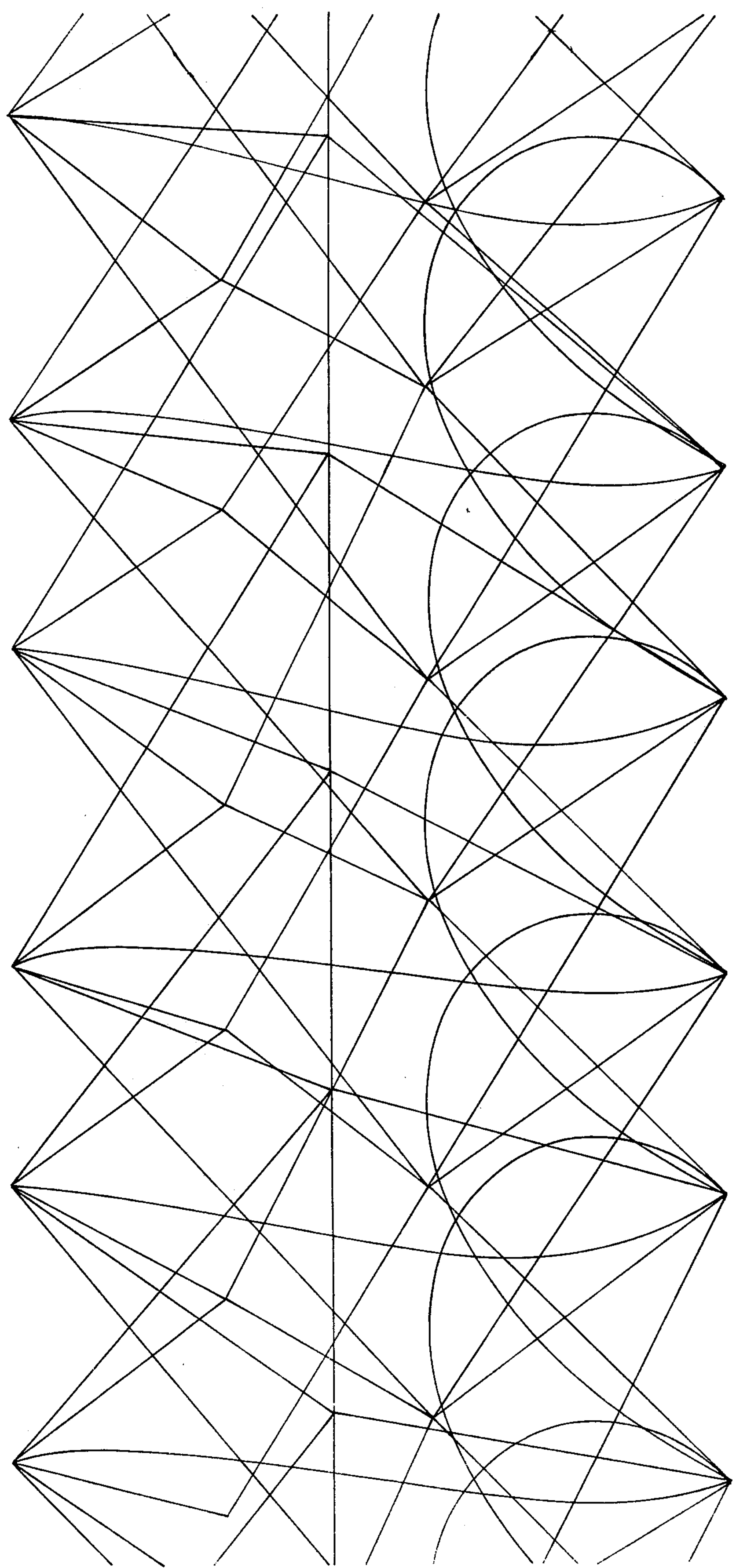
FIG. 6 is another stereoscopic pattern employing representations formed in straight and curved lines.

Instead of arranging straight lines at varying angles, curved line representations may be used, with the curvature of the line having the effect of continuously varying the angle of the line. Curved lines also may have a horizontal component or element so that the curved line representations produce images which extend horizontally as well as spatially. An example of a pattern employing straight and curved lines is shown in FIG. 6. Since the lines may be oriented at various angles and may be curved, the line representations can be combined to outline or to otherwise define or depict triangles or diamond-shapes or even more complex forms or varying shapes.

Each of the patterns of FIGS. 4, 5 and 6 can also be used as individual representations in building a more complex pattern. In such a case, each of the images would have a stereoscopic effect within itself in addition to having a stereoscopic effect relative to other images.

In designing a pattern according to the present invention, the maximum and minimum separation distances between representations depend upon the intended manner of viewing the pattern. For the purpose of viewing the pattern with a diverging or straight line of vision it is important that the representations not be placed further apart than the distance between the pupils of the viewer's eyes (approximately $2\frac{5}{8}$ inches) because it is very difficult to diverge one's line of vision more than a few degrees. For the purpose of viewing the pattern with a converging or cross-eyed line of vision, there is no limit to the maximum separation distance between images; however, it is uncomfortable and somewhat difficult for the viewer to view an image which appears to be closer than 14 inches from the viewer's eyes. If the representations are separated such that they produce an image which appears to be closer than 14 inches from the viewer, it will require the viewer to converge his line of vision to such an extent that it becomes difficult to view the pattern. The image, however, can be moved away from the viewer beyond the 14-inch limit by moving the entire pattern away from the viewer, so that there is no practical limit to the distance by which the representations may be separated. Using either manner of viewing, the representations must be far enough apart so as to be perceptively distinct. If the representations are placed so close together that they appear to be a single representation, the resulting image will appear to be on the backing, and the stereoscopic effect will be lost.

It has been found that a more effective stereoscopic effect can be achieved if the variation in the separation distances between adjacent pairs of representations is greater for patterns intended primarily for viewing with a converging line of vision than for patterns intended primarily for viewing with a diverging or straight line of vision. If it is known which manner of viewing will be primarily used, it is preferable to produce the pattern with the variation in separation distances increased or decreased accordingly. Patterns can, of course, always be produced which are capable of being viewed in either manner.

For any manner of viewing, however, it is preferable that the variations in the separation distance between adjacent pairs of representations are not too large. Once the viewer's eyes have focused on a pair of representations, it is difficult for the viewer to adjust his vision to a pair of representations with an inordinately different separation distance. If the difference is extreme, the viewer will be unable to view more than a single pair of representations at any one time, thus reducing the stereoscopic effect because no relative depth between images will be manifest.

It is also important in producing the patterns of the present invention that each of the representations be spaced in a substantially horizontal row. The viewer ordinarily views the patterns with his eyes spaced horizontally and rows of representations must be parallel to the axis between the pupils of the viewer's eyes. While the rows may be at a slight angle, if the angle is too severe, the viewer will have a difficult time orienting himself to see the stereoscopic effect. As used in this description and the claims, "horizontal" refers to the orientation of the patterns when viewed. It is understood that the patterns may be in some other orientation when produced, but it is important that the rows be substantially horizontal when in a viewing position.

It can be seen that, although the pattern is relatively close to the viewer, viewing the pattern with a diverging or straight line of vision simulates distance vision. Such patterns can be advantageously employed in the work area of persons engaged in work requiring continuous close-up viewing, such as those involved in assembly or inspection of small parts, or the making of detailed drawings. When placed in such work areas, the worker can take a break from his work, and view one of the patterns which may be placed relatively close to him, and by viewing the pattern with a straight or diverging line of vision, the worker simulates looking into the distance which may be otherwise impractical in confined work areas. This viewing will relax and rest and exercise the eyes of the one who is involved in continuous close-up work.

FIGS. 7 and 8 illustrate an alternative embodiment of the patterns of the present invention which utilizes a sliding transparent overlay to produce a moving depth effect. In this embodiment, several representations, such as stars 31, 32 and 33, are placed in the horizontal row. For simplicity, only three stars in a single horizontal line are shown, but it is to be understood that a multiplicity of representations arranged in several horizontal rows can be used. The stars 31 and 33 are mounted on an opaque backing layer 34 while the star 32 is mounted on a transparent overlay 35, which overlay is placed over the backing layer 34. When the overlay 35 is moved horizontally with respect to the backing layer 34, the star 32 also moves horizontally with respect to stars 31 and 33. Because horizontal spacing is critical to producing a stereoscopic effect, the resulting images 36 and 37 appear to move toward and away from the viewer 38. In FIG. 7, the stars 31, 32 and 33 are equally spaced apart so that images 36 and 37 appear to be at an equal distance in front of the backing. In FIG. 8, the star 32 mounted on the overlay 35 has been moved to the right so that, to the viewer 38, the left image 36 has moved toward him while the right image 37 has moved away from him.

The patterns of the present invention can be viewed in yet another manner as shown in FIGS. 9 and 10 by viewing with a double overlap of representations. The pattern 40 of FIGS. 9 and 10 is similar to that of FIGS. 1 and 2 comprising a backing 41 with a row 42 of substantially horizontally spaced representations, such as dots. In looking at the pattern 40 with a straight or diverging line of vision (FIG. 9), the viewer 43 aims his vision so that his left eye 44 views the left dot 45 of each adjacent pair of dots while his right eye 46 views the next adjacent right dot 47. However, the viewer can alter his line of vision to skip over the adjacent dot 47 to view the next right-most adjacent dot 48, so that his left eye 44 views the left dot 45, as before, while his right eye 46 views the second-most adjacent right dot 48. Because dots 45 and 48 are further apart than dots 45 and 47, the image 49 produced by the second double-overlap manner of viewing appears to be further away than the image 50 produced by the previously discussed single-overlap manner of viewing.

Double overlapping viewing can also be combined with a cross-eyed or converging line of vision as shown in FIG. 10. The viewer 43 may look at the pattern 40 so that his left eye 44 sees the right dot 48 of each adjacent pair of dots while his right eye 46 sees the next left-most adjacent dot 47 to produce an image 51, or he may look at the pattern 40 so that his left eye 44 sees the right dot 48 while his right eye 46 sees the second left-most adjacent dot 45 to produce an image 52 which is closer than the image 51.

Figure 11:
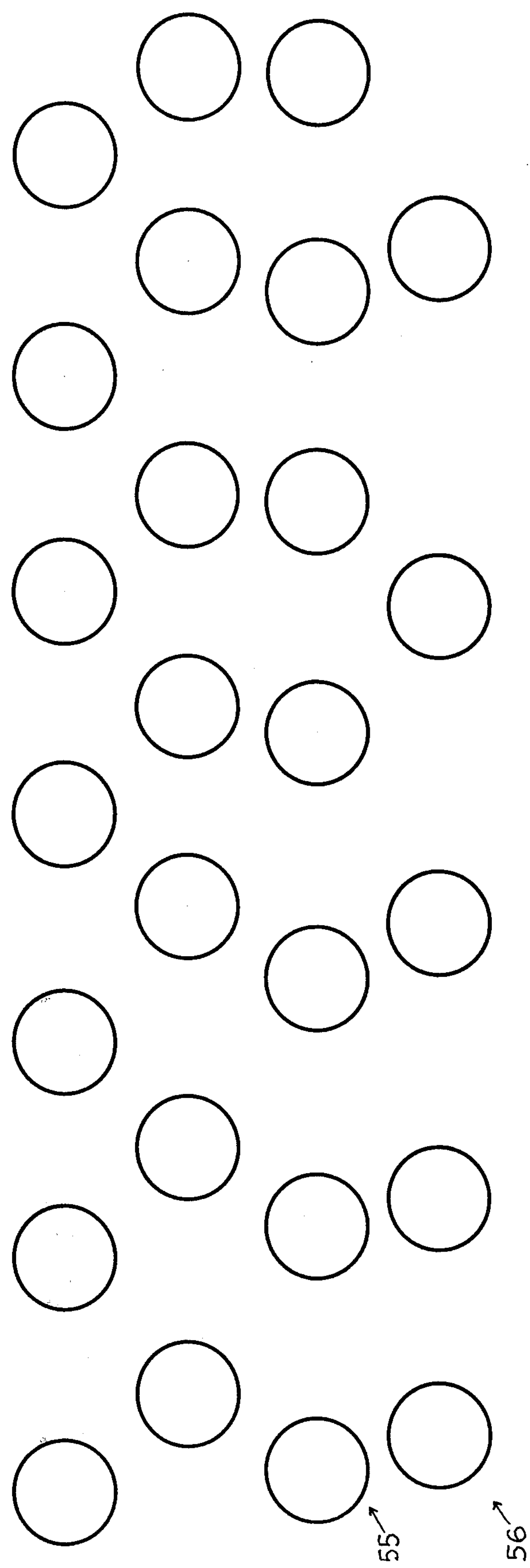
FIG. 11 is a stereoscopic pattern produced in accordance with the present invention demonstrating a possible double overlap of representations aided with a transition row of representations.

Switching from single overlap to double overlap may be difficult to an inexperienced viewer, so to aid in the switch, an adjacent row of representation having a progressively greater distance between the pairs of representations may be used. FIG. 11 shows a pattern with a row 55 of dots which may be viewed with either a single or a double overlap, and an adjacent row 56 of dots having a progressively greater distance between each adjacent pair of dots. The viewer can look at the row 55 of dots using a single-overlap manner of viewing, and then direct his attention to the left end of the adjacent row 56 of dots, which has approximately the same spacing between the adjacent pair of dots as that between each pair in the row 55. The viewer can then follow along the row 56 of dots toward the right until he is concentrating on the right end of the row 56 of dots, which has approximately double the spacing between the adjacent pair of dots as that between each pair in the row 55. The viewer is now prepared to direct his attention back toward the row 55 which can now be viewed in a double overlap manner since the viewer's line of vision is accustomed to the greater distance between dots necessary to view the dots in a double-overlap manner.

Figure 12:
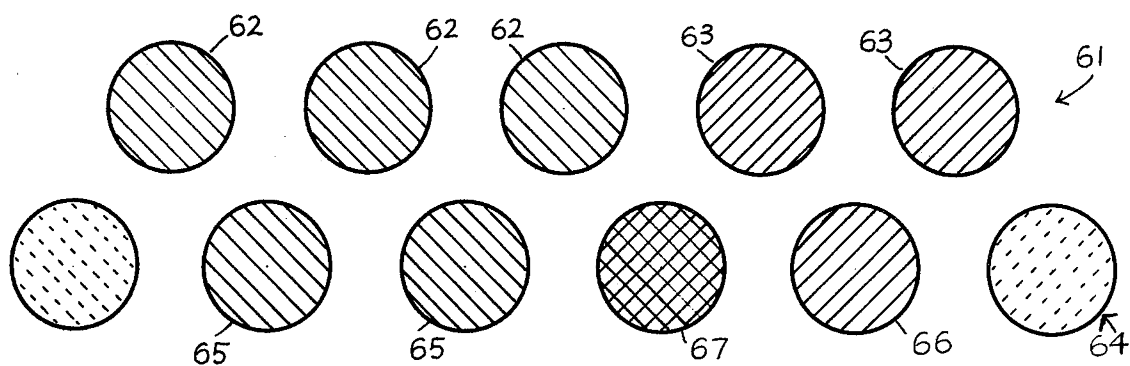
FIG. 12 is a schematic view illustrating the use of various colors of the pattern to produce a mixing color or vibration effect.

Another embodiment of the present invention employs representations of different colors as shown in FIG. 12. The upper line 61 illustrates a simple color-mixed pattern using dots in a single horizontal row. The dots 62 on the left of the horizontal row are one color while the dots 63 on the right are another color. The images produced by viewing this pattern are shown on the lower line 64. The images 65 seen on the left are stereoscopic images of the first color and the image 66 seen on the right is a stereoscopic image of the second color, but in the middle an image 67 is seen which is a mixture of the two colors. By chosing complimentary colors, such as red and green, the middle image 67 will appear to vibrate due to the mix in colors, producing an unusual effect.

Figure 14:
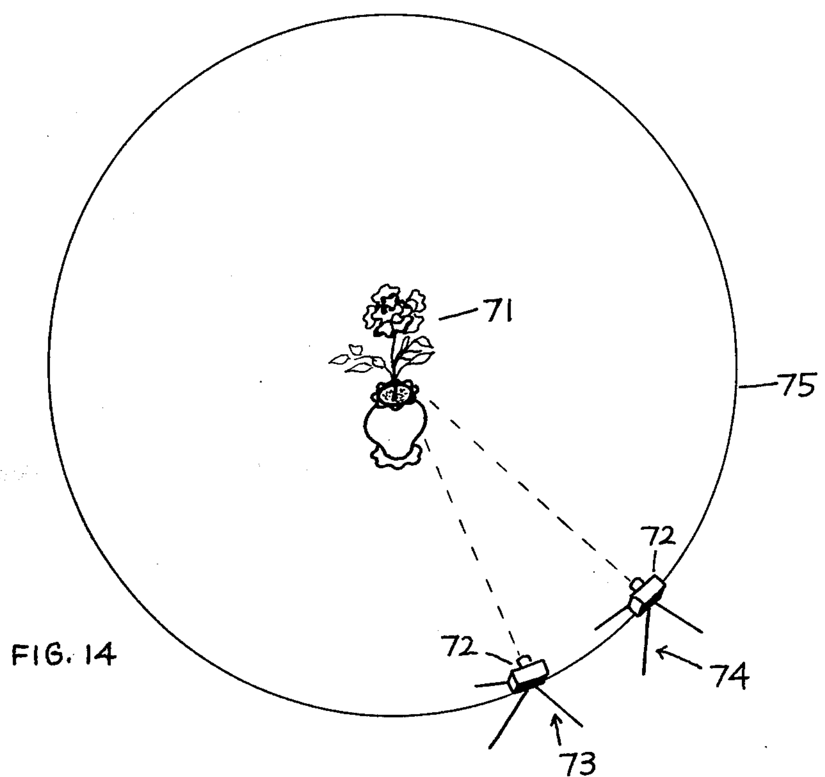
FIG. 14 is a schematic view illustrating a method of producing the sequential series of perspective views of the subject of FIG. 13.
Figure 13:
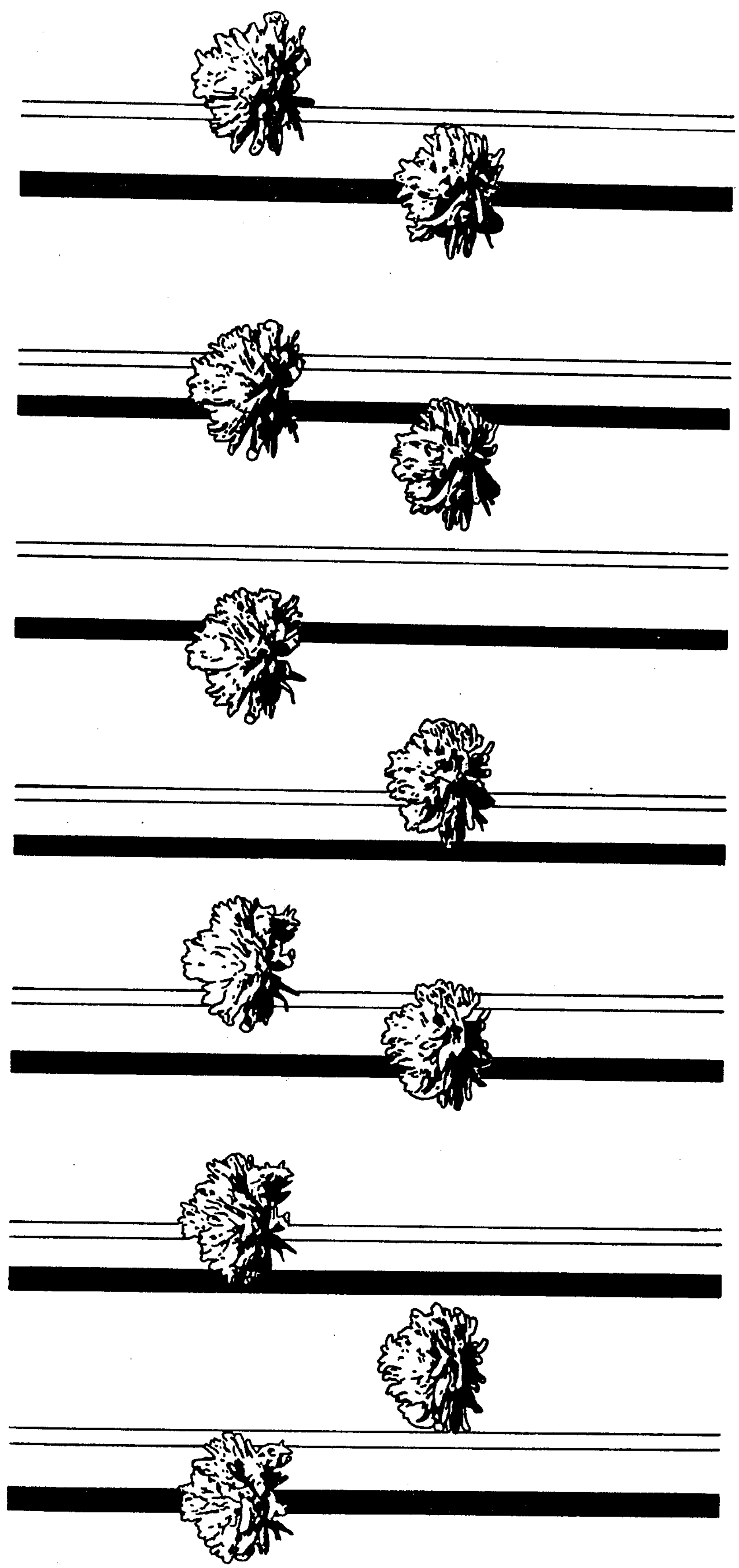
FIG. 13 is a stereoscopic pattern produced in accordance with the present invention using representations of a sequential series of perspective views of the same subject.

Most of the representations shown in the drawings have been identical and relatively simple symbols, such as dots or stars. However, the representations need not be identical. For instance, each of the representations may be one of a sequential series of perspective views of the same subject, as shown in FIG. 13 wherein the representations include perspective views of a flower. These perspective views can be produced photographically by taking a sequential series of pictures of the subject, moving the camera a very small distance between each of the pictures in the sequence as shown in FIG. 14, wherein the subject is a flower 71 which is photographed by a camera 72. After photographing the flower 71 from one position 73, the camera is moved a small distance to the right to a next position 74 and the flower 71 is photographed again. When the subject is relatively small, as in the flower 71, the camera 72 may be moved around in a circular path 75. By moving the camera 72 in a circle, when the sequence is complete, the camera will eventually return to the first position 73, and a continuously repetitive series of pictures will be obtained, which can be used to produce a continuous pattern. Alternatively, the same effect can be achieved by stationing the camera 72 in a fixed position and rotating the subject flower 71 incrementally a small amount between each photograph in the sequence. Each representation comprises a slightly different perspective view of the same subject, which representations together form a sequential series of perspective views. When the representations are grouped together in pairs in viewing the pattern, the viewer sees a three-dimensional stereoscopic view of the subject in each image. The representations may also be spaced apart at various distances so that each stereoscopic image is itself in a different perspective plane.

The perspective of each image is reversed if the pattern is viewed in a different manner, such as if the pattern is viewed convergingly instead of divergingly, or divergingly instead of converging. Therefore, the arrangement of the representations will depend upon the intended manner of viewing the pattern. If the pattern is intended to be viewed primarily with a diverging or straight line of vision, the representations should be arranged in the same order in which the sequential series of perspective views are obtained in order to reproduce the subject in its proper perspective. In other words, when the camera is moved from left to right in front of the subject to produce the sequential series, the representations should be placed from left to right in the same order. If, however, the pattern is intended to be viewed primarily cross-eyed or with a converging line of vision, the representations should be arranged in reverse order to obtain the proper perspective, that is, the representations should be placed in order from right to left when the camera is moved from left to right in front of the subject to produce the sequential series of perspective views.

Figure 15:
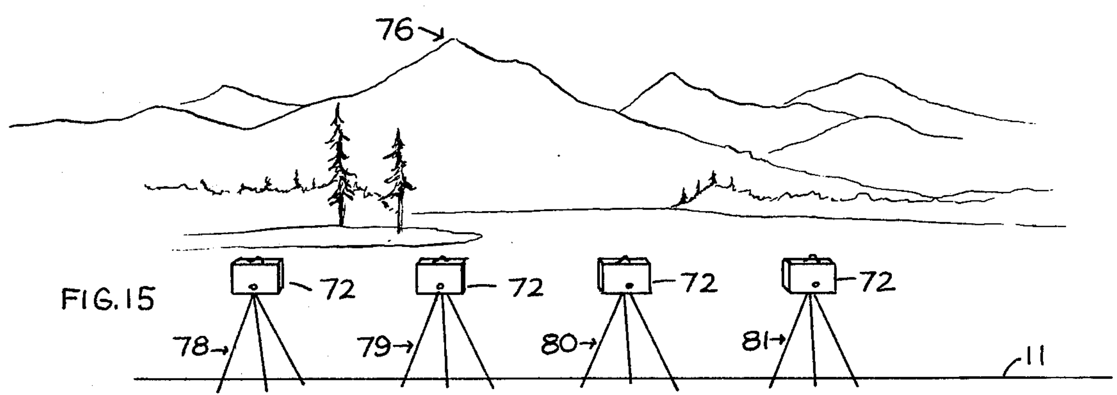
FIG. 15 is a schematic view illustrating another method of producing a sequential series of perspective views.

When the subject is very large, such as a landscape 76 in FIG. 15, it is impossible to move the camera 72 around in a circle, so the camera 72 is moved along a straight line 77 a small distance between each photograph position 78, 79, 80, 81 etc., to produce a sequential series perspective views. In such a case, the camera will not return to the first position 78, so the series of views will not be continuously repetitive.

Instead of producing the views photographically, the views may also be produced artistically by hand with each view depicting what would be seen at each camera position.

In order to completely eliminate any ghost images at the side of the pattern, the pattern may be faded or tapered off at the edges. In this manner each of the representations are progressively closer together toward the side of the pattern. Thus as the viewer sees the pattern, the images at the sides trail off into the distance or trail toward the viewer and the ghost images are eliminated.

Instead of arranging each of the representations in a straight horizontal row, the row may be curved somewhat in a spherical perspective. This facilitates the tapering off eliminating the ghost images.

Figure 16:
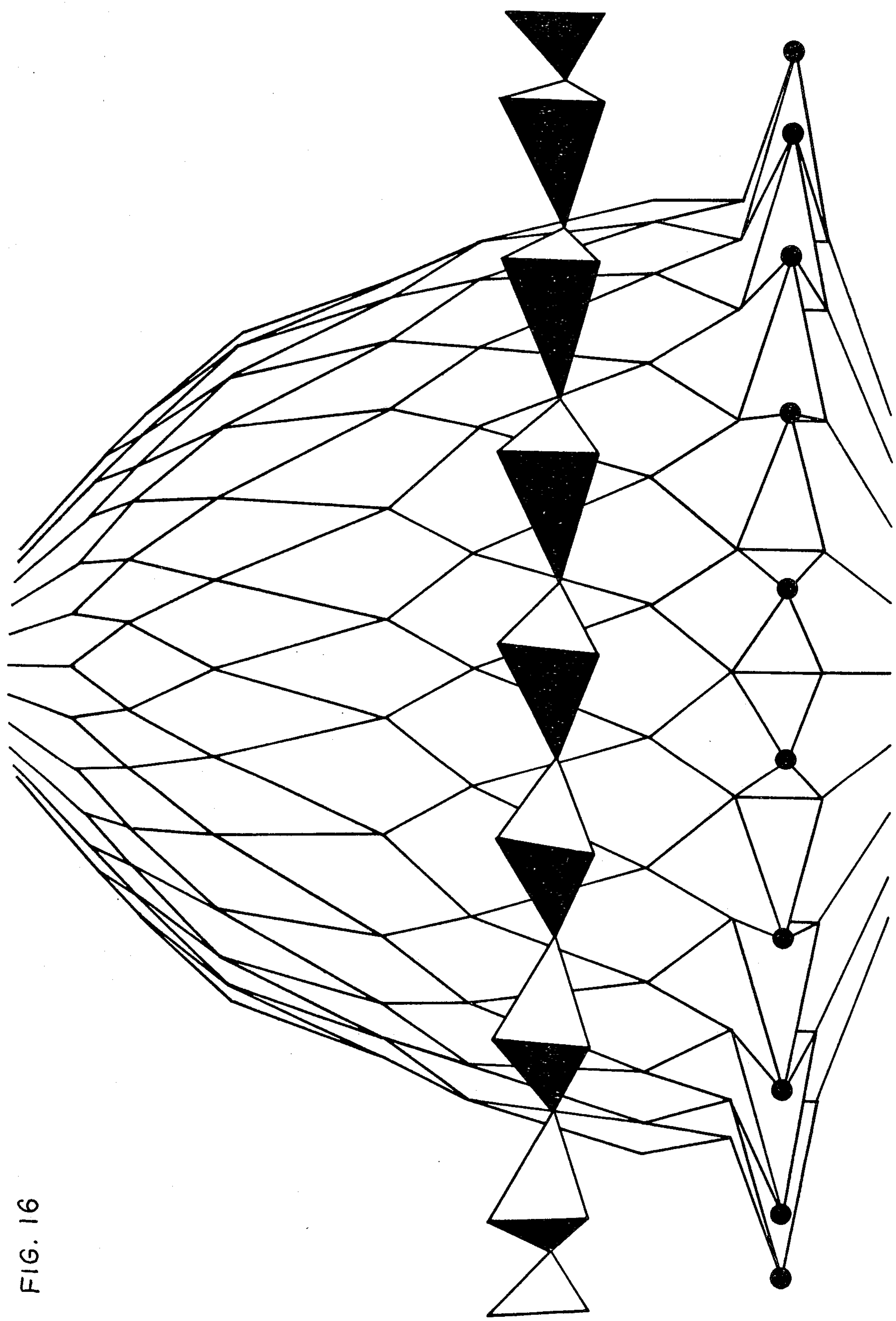
FIG. 16 is another stereoscopic pattern produced in accordance with the present invention.

The pattern of FIG. 16 demonstrates the use of representations which taper off at the edges of the pattern and which are arranged in a substantially horizontal curved row along a spherical perspective. The representations used in this pattern are lines which are combined to define varying diamond-shapes and triangular shapes, similar darkened triangles, and dots. Near the top of the pattern, the representations are not aligned in a perfectly straight horizontal row, but are instead aligned along a substantially horizontal row which is curved in a spherical perspective. Each of the representations taper off toward the edges of pattern, becoming closer together, thus eliminating or reducing the effect of the ghost images. As with each of the previous patterns, the pattern of FIG. 16 can be viewed close-up with a straight or diverging line of vision or at a distance with a converging line of vision, or, of course, the pattern may be viewed in an ordinary manner.

While the invention has been shown and described with respect to specific embodiments thereof, these are intended for the purposes of illustrations rather than limitations, and further modifications and variations will be apparent to those skilled in the art all within the intended spirit and scope of this invention.

What is claimed is:

1. A pattern capable of being viewed to produce a stereoscopic effect, which comprises:
   - a blank backing, and
   - a multiplicity of representations on said backing spaced apart in substantially horizontal rows, each of the representations in each horizontal row being substantially identical, an adjacent pair of said representations when viewed stereoscopically producing a first stereoscopic image and two ghost images, another of said representations located on said backing in a position in which the image produced by stereoscopically viewing said other representation combines with one of said ghost images produced by one of said adjacent pair of representations to produce second stereoscopic image, the remainder of said multiplicity of representations located on said backing in positions in which the images produced by each of said representations combine with ghost images produced by other representations to produce additional stereoscopic images, the spacing between various pairs of adjacent representations in each horizontal row being varied to produce a plurality of horizontally spaced stereoscopic images perceived in various planes from said pairs of adjacent representations, said backing being devoid of any marking other than said representations to avoid producing distracting images.

2. A pattern as in claim 1, in which each of said representations is identical.

3. A pattern as in claim 1, in which said representations form a multiplicity of horizontally-spaced generally-vertical lines.

4. A pattern as in claim 3, in which said lines are combined to define varying shapes.

5. A pattern as in claim 1, in which said multiplicity of representations are a sequential series of perspective views of the same subject.

6. A pattern as in claim 1, in which the multiplicity of representations on said backing is spaced apart in substantially horizontal rows with each adjacent pair of representations having different spacing between each other.

7. A pattern as in claim 1 for viewing with a straight or diverging line of vision, in which the spacing between the various pairs of adjacent representations does not exceed 2⅝ inches.

8. A pattern as in claim 1 for viewing with a converging line of vision, comprising in addition means for providing a physical reference in the planes in which said stereoscopic images appear, said means comprising a reference mounted around and located a substantial distance in front of said backing.

9. A pattern as in claim 1, in which said multiplicity of representations comprises:

a plurality of identical first representations on said backing spaced apart in a substantially horizontal first row, and a plurality of identical second representations on said backing spaced apart in a substantially horizontal second row, which is substantially parallel to said first row, the spacing between said second representations being different from the spacing between said first representations.

10. A pattern capable of being viewed to produce a stereoscopic effect, which comprises:

a backing layer;

a movable transparent overlay horizontally slidably mounted over said backing layer; and a multiplicity of representations, some of which are on said backing layer and the remainder of which are on said overlay, the representations being spaced apart in substantially horizontal rows, each of the representations in each horizontal row being substantially identical, the spacing between various pairs of adjacent representations being varied to produce a plurality of horizontally spaced stereoscopic images from said pairs of adjacent representations, the movement of said overlay producing a movement of some of said images in a direction perpendicular to the plane of the overlay.

11. A method of producing a pattern capable of being viewed to produce a stereoscopic effect, which comprises the steps of:

placing a first representation on a blank backing;

placing a second substantially identical representation on the backing substantially horizontal to and a fixed distance apart from said first representation, whereby said first and second representations when viewed stereoscopically will produce a first stereoscopic image and two ghost images;

placing a substantially identical third representation on the backing substantially horizontal to said first and second representations but being a distance apart from either said first or second representation different from said fixed distance between said first and second representations, said third representation placed in a position in which the image produced by stereoscopically viewing said third representation combines with one of said ghost images produced by one of said first and second representations to produce a second stereoscopic image perceived in a plane different from said first stereoscopic image; and preventing the placement of additional unpaired representations which produce distracting images.

12. A method of producing a pattern as recited in claim 11, wherein identical representations are placed in each of the steps.

13. A method of producing a pattern as recited in claim 11, comprising the additional steps of placing additional representations on the backing substantially horizontal to said first, second, and third representations and to each other, with pairs of adjacent representations having varied spacing between each other, said additional representations being placed in positions in which the images produced by each of said additional representations combine with ghost images produced by other representations to produce additional stereoscopic images.

14. A method of producing a pattern as recited in claim 13, wherein said representations are placed to form horizontally-spaced generally-horizontal lines.

15. A method of producing a pattern as recited in claim 14, wherein said representations are placed to form lines which combine to define varying shapes.

16. A method of producing a pattern as recited in claim 11, comprising the additional step of preparing a sequential series of consecutive perspective views of the same subject each consecutive pair of views constituting a stereoscopic view and using said sequential series of views as the representations in the other steps.

17. A method of producing a pattern as recited in claim 11, comprising the additional step of placing additional representations on the backing substantially horizontal to each other in a line substantially parallel to said first, second and third representations with pairs of adjacent representations having different spacing between each other, said additional representations being placed in positions in which the images produced by each of said representations combine with ghost images produced by other representations to produce additional stereoscopic images.

18. A method of producing a pattern for viewing with a straight or diverging line of vision as recited in claim 11, wherein the representations are placed no further apart than the distance between the pupils of the eyes of the intended viewer.

19. A method of producing a pattern as recited in claim 18, wherein the representations are placed no further than 2⅝ inches apart.

* * * * *